United States Patent [19]
Mason

[11] Patent Number: 5,223,673
[45] Date of Patent: Jun. 29, 1993

[54] MODULAR ELECTRICAL OUTLET ASSEMBLY

[76] Inventor: Gay L. Mason, Rte. #1, Box 7225, Morrisville, Vt. 05661

[21] Appl. No.: 625,088

[22] Filed: Dec. 10, 1990

[51] Int. Cl.[5] .............................................. H02G 3/08
[52] U.S. Cl. ................................... 174/53; 174/57; 174/66
[58] Field of Search .................. 174/57, 53, 55, 66, 174/58; 220/3.7, 241; 439/535, 536

[56] References Cited

U.S. PATENT DOCUMENTS

| | | | |
|---|---|---|---|
| 1,752,322 | 4/1930 | Adam | 174/57 |
| 1,999,194 | 4/1935 | Hubbell, Jr. | 174/57 |
| 2,934,590 | 4/1960 | Thompson et al. | 174/53 |
| 3,168,612 | 2/1965 | Sorenson | 174/57 |
| 3,185,760 | 5/1965 | Despard | 174/54 |
| 3,437,737 | 4/1969 | Wagner | 174/55 |
| 3,620,404 | 11/1971 | Grasso | 174/58 X |
| 3,814,834 | 6/1974 | Glader | 174/57 |
| 3,885,852 | 5/1975 | Grove | 439/441 |
| 4,059,328 | 11/1977 | Rigo | 439/535 |

Primary Examiner—Leo P. Picard
Assistant Examiner—David A. Tone
Attorney, Agent, or Firm—Herbert L. Gatewood

[57] ABSTRACT

A modular type receptacle unit useful as an electrical outlet having only two components offering quick connect/disconnect features between the outlet box and cover plate unit. The outlet box and coverplate unit can be assembled together without need for screw fasteners and tools.

24 Claims, 4 Drawing Sheets

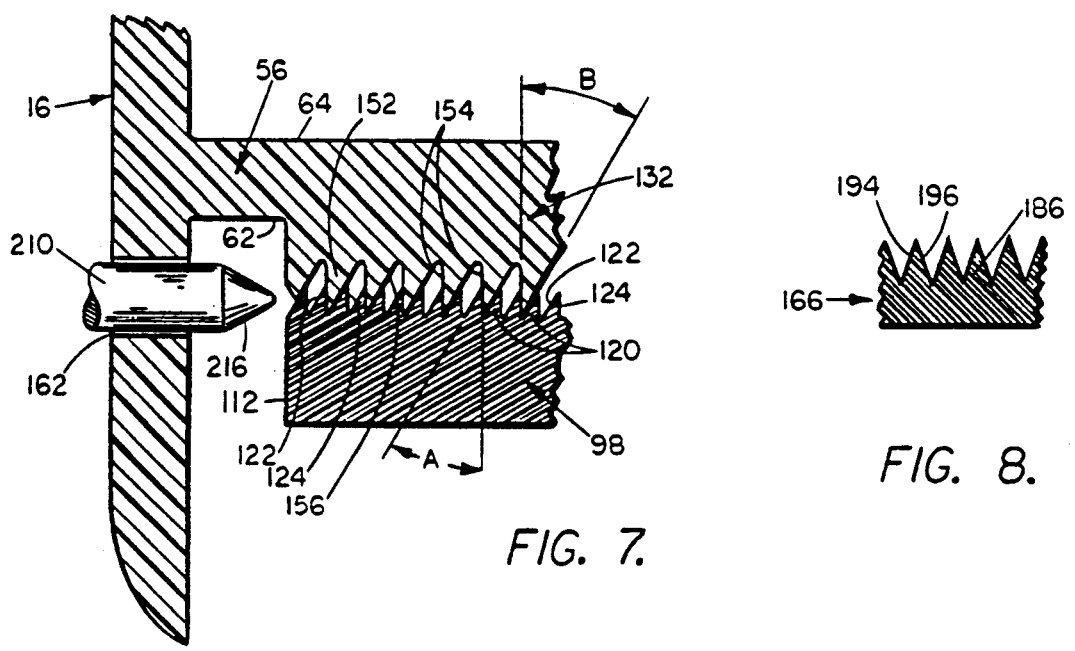
FIG. 7.
FIG. 8.
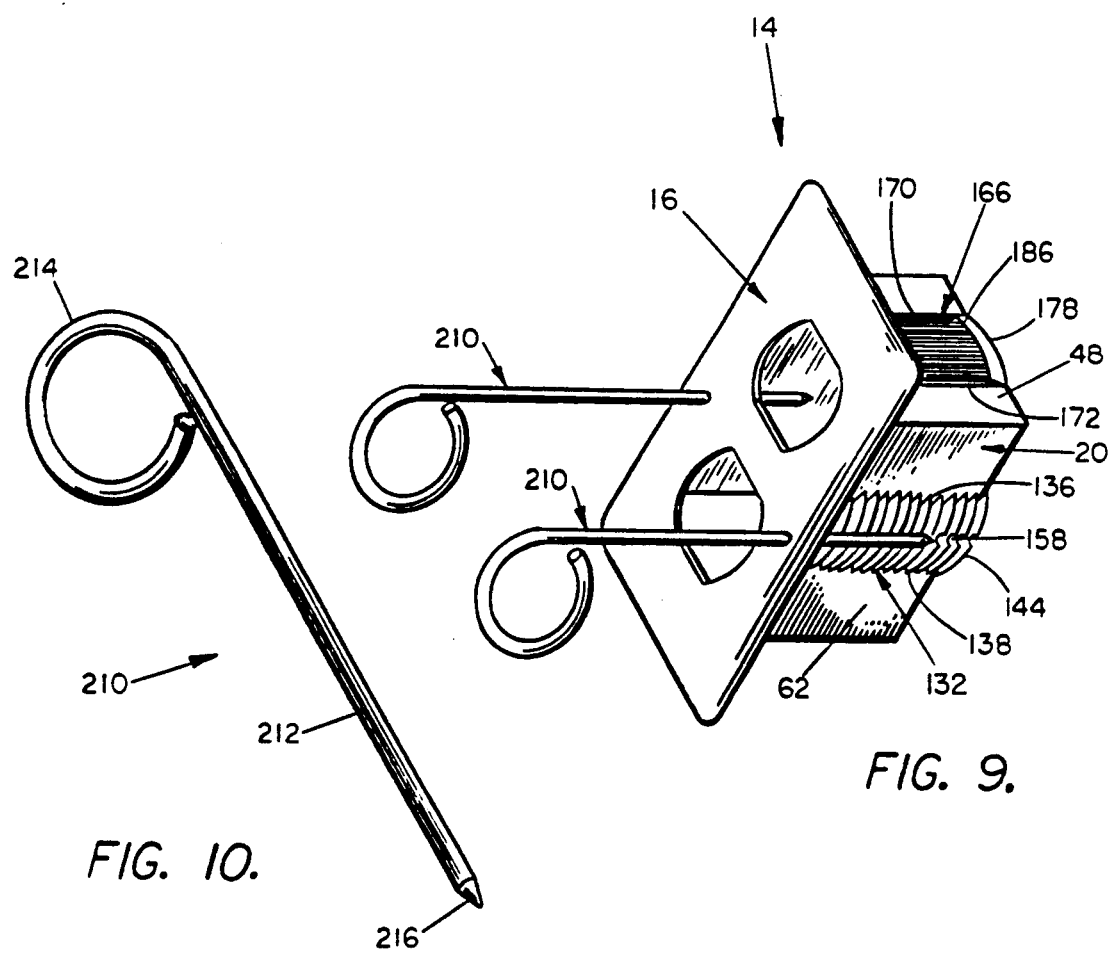
FIG. 10.
FIG. 9.

MODULAR ELECTRICAL OUTLET ASSEMBLY

BACKGROUND OF THE INVENTION (1). Field of the Invention

This invention relates, in general, to a modular type receptacle unit or assembly useful in an electrical outlet, switch or junction box assembly. More particularly, the invention relates to an improved electrical outlet, switch or junction box assembly comprising, in its basic aspects, only two components offering quick connect-/disconnect features between the outlet, switch or junction box and the cover plate unit. Further, the invention provides quick connect/disconnect features between an outlet box and the electrical receptacle or wall socket to be, or already, located therein.

(2). Description of the Prior Art

With the ever increasing costs for electrical work, and the general desire for improved efficiencies and greater time savings in installation and repair, efforts have been made heretofore to devise an electrical outlet wall unit for home and building electrical wiring which offers savings in such areas, compared to the conventional outlet unit. By conventional outlet unit is meant the widely used electrical outlet unit having a rectangular-shaped outlet box into the cavity of which a rectangular-shaped plug receptacle is mounted by screws so as to be relatively flush with the opening of the box and which opening is then covered by a face plate having openings for the electrical plugs in the receptacle and fastened by a screw to the receptacle. In some cases, the "face plate" comprises two components, i.e., a back plate or frame and a front plate fitting therein.

The conventional electrical outlet units have the disadvantage of being slow to assemble and disassemble, even after the outlet box itself has been installed on a wall stud or the like. This is due to the fact that such units require, in general, two distinct assemblies/disassemblies, necessitating the screwing in, or unscrewing, by the electrician of at least three screws. Furthermore, as such conventional units are made up of a number of different components, i.e., electrical outlet box, receptacle unit, face plate, and three threaded screws, there is the necessity of having all of such components together, at the instance of a particular installation, otherwise such unit cannot then be fully installed. Such a complete installation may, for example, be delayed until a screw is located to fasten the face plate to the plug receptacle. Those who are familiar with the assembly/disassembly of such conventional electrical outlet units are readily familiar with the frustrations caused in looking for a dropped screw fastener. Oftentimes, particularly in building construction, such a dropped screw cannot be readily located and a further screw fastener need be obtained, to complete the installation. In the event of such a happening, this further reduces the efficiencies in the installation of electrical outlet units and adds to the time involved in making the installation, resulting in increased labor costs. In commercial buildings, particularly, where numerous electrical outlet installations must be made, the problems associated with the use of such conventional electrical outlet units having mounting tabs for screw fasteners can be readily appreciated. Nevertheless, to a somewhat lesser degree, the same problems exist in residential housing.

A further problem in the use of conventional outlet units having vertically disposed mounting tabs or ears involves the manner in which the outlet boxes are usually installed. The outlet boxes are mounted by screws to a stud so that the open face of the box protrudes outwardly from the front edge of the stud about a ½ inch or so. This is so that when, for example, the dry wall is installed, the front edges of the outlet box will be flush with the outside planar surface of the dry wall. Nevertheless, these outlet boxes are often incorrectly installed e.g., they may not be truly vertical. In that case, the front of the outlet box will not be flush with the dry wall surface. Sometimes the thickness of the dry wall panels may vary slightly from one another. Thus, if the electrician installs the outlet box so that its front edge sticks out ½", this may provide an outlet box flush with the dry wall surface, in some cases, but not in others. These mounting problems may not be discovered, however, until the sheetrocker comes along later to install the dry wall. At that time, the sheetrocker must make the necessary measurements to determine the location of the cut-outs for the outlet boxes and then cut out the openings in the dry wall panel being installed, so that the dry wall can be attached to the studs. Where the outlet box is not vertical, or protrudes outwardly more than the thickness of the dry wall panel, or less than such thickness, this presents some difficulty to the electrician when he comes along later to fasten the wall socket with the screw fasteners provided with such assemblies, to the already mounted outlet boxes. The outlet box is mounted behind the wall and its orientation to the stud, hence its flushness to the dry wall surface, cannot then ordinarily be adjusted without taking down the wall. Thus, when the face plate is mounted to the plug receptacle, the result is, in the one case, a face plate that is not flush with the dry wall surface. Such a mounting is obviously undesirable in its appearance. In the other case, longer screws may need be obtained to complete the mounting.

In addition to the above difficulties, the manner of mounting the conventional outlet boxes reduces somewhat the efficiencies of the sheetrocker. This is due, in part at least, to the fact that the sheetrocker must cut out each opening in the dry wall for the outlet boxes as such are encountered. Otherwise, the dry wall panel cannot be fully installed. As a result, one job is interrupted while another is necessarily performed. It would be far more efficient and faster if the sheetrocker could install the dry wall without this interruption, coming along later after the installation and then, at one time, cutting out all the openings for the outlet boxes. Nevertheless, such an approach is not now possible with the conventional electrical outlet units.

The costs of labor for the installation of the conventional electrical outlet assemblies greatly overshadows, it is believed, the costs of the devices per se. Thus, a savings in installation costs can still be made even where such electrical outlet devices themselves may be somewhat more costly than the conventional electrical outlet unit. Exemplary of various prior attempts to address this and related problems with electrical units other than outlet boxes, e.g. switch boxes, junction boxes, etc. are shown in U.S. Pat. Nos. 2,934,590; 3,168,612; 3,185,760; 3,437,737; 3,885,852; and 4,059,328.

U.S. Pat. No. 2,934,950, which issued Apr. 26, 1960, is directed to an electrical outlet receptacle which can be installed without requiring the use of screws or similar fastening means. In general, the outlet receptacle comprises a rectangular-shaped box having an open front defined by top and bottom walls, along the front edge of which are provided elongated notches or slots each parallel to a respective front edge, a receptacle assembly, and a cover plate. The receptacle assembly is provided with resilient fastening clips at its top and bottom, each of which is provided with a lug which fits into a respective notch in the outlet box on assembly of the two members together. The cover plate is provided on its inner surface with outwardly extending brackets, each of which comprises a spring arm which, on assembly of the cover plate with the outlet box, is received into respective clips located on the receptacle assembly and are frictionally engaged therewith. Nevertheless, while the receptacle assembly and cover plate can be assembled with the outlet box without need for screw fasteners or a screw driver, the receptacle disclosed still suffers from at least some of the earlier mentioned problems. For example, the outlet box must be installed in a truly vertical manner; otherwise, the face plate will not be flush with the surface of the wall. Even so, however, the problem resulting from somewhat varying thicknesses of dry wall panels remains.

U.S. Pat. No. 3,168,612 discloses a mounting adapter for attaching an electric switch case and its associated snap action button actuator to a mounting plate. The mounting adapter, in general, comprises a flat, rectangular-shaped frame portion defined by spaced-apart side flanges and spaced-apart end flanges which, in turn, define a rectangular-shaped opening Integral with the end flanges and extending rearwardly through the opening are spaced-apart bracket elements at the ends of each of which is provided a forwardly extending spring element. These elements extend in planes extending outwardly from the respective planes of the brackets, the free ends of which are arcuately formed. Both lateral edges of each bracket element have an array of spaced apart slots or notches, each of the notches along one edge being aligned with a corresponding notch on the other edge. The switch assembly includes a metal plate having a pair of arms which engage with the switch case at each end and retain the plate thereon. At the juncture between the front face and each end of the switch case, the plate is provided with a pair of integrally formed lugs which are adapted to engage a corresponding pair of notches in the bracket, on assembly of the switch assembly with the mounting adapter. Thereafter, the combined adapter and switch assembly are passed through a rectangular shaped aperture or hole in the mounting plate until the side and end flanges of the adapter lie flat against the outer planar surface of the plate. Due to the outward spring tension exerted by the forwardly extending spring elements on the mounting adapter, the arcuate bowed ends of the spring elements are urged against the top and bottom edge of the aperture in the mounting plate. Thus, the mounting adapter is secured to, and can be removed from, the mounting plate, according to the patentee, by spring-like snap action. Although such a mounting adapter may provide for installation of a switch case in a wall plate without need for screw fasteners, there is believed to be no specific disclosure as to how the wall plate itself is fastened to the dry wall, or other wall member in which the switch case is located. If this is accomplished by the spring members being merely frictionally engaged with the top and bottom edges of the cut-out in the wall, then it seems that obtaining a good fit is quite problematic. The fit would depend, it seems, not only on the dimensions of the opening, but also upon which particular set of notches in which the lugs are located. Selection of the wrong notches could result, it seems, in the mounting adapter being either too tight for the cover plate to be pulled in flush with the wall surface, or too loose whereby the wall plate might not be held closely and flush against the wall surface. Either could result in a less than satisfactory installation and appearance. Moreover, there seems to be no way in which the vertical alignment of the mounting adapter can be adjusted in the event the wall cut-out is not properly oriented in vertical disposition.

U.S. Pat. No. 3,185,760 discloses means for mounting wiring devices such as electrical outlets and switch boxes. Thus, the conventional mounting strap for mounting a two apertured electrical receptacle having support tabs extending from each end thereof each having a screw opening therein is provided with integral rectangular-shaped tongues adjacent each of the tabs and located in opposing pairs extending outwardly from the mounting strap. Stirrup-like devices of U-shape construction, each having a cross piece extending across the back side of the receptacle and flat side members extending forwardly from the ends of the crosspiece, are connected at their ends to respective rectangular-shaped tongues provided on the mounting strap. The stirrup-like devices are each provided with spaced-apart sharp pointed tongues or barbs which are so disposed as to extend forwardly toward the mounting strap at about a 45 degree angle from the vertical. Thus, on pushing the receptacle combination into the outlet box, the device can only be pushed in so far, i.e. until the flat back side of the support tabs on the mounting strap come in contact with the wall surface. On insertion of the receptacle into the outlet box, the pointed tongues engage the top and bottom inside surfaces of the outlet box thereby holding the receptacle in position and resisting any effort to remove the receptacle from the outlet box. A customary wall plate is attached to the face of the receptacle, according to the patentee, by means of a screw entering the mounting strap as usual. Thus, this device not only requires modification of the conventional receptacle mounting strap, it also still requires use of a screw fastener for mounting the face or wall plate to the receptacle, as usually done with such a mounting strap. Furthermore, in the event the outlet box mounted on the supporting structure is not truly vertical or horizontally disposed, the push-in box mounting allows for no adjustment whereby the cover plate, when attached, will be vertically disposed, as desired, or made flush with the wall surface. A cover plate biased to a nonvertical disposition or not flush with the wall, even though such is slight, is undesirable as it is distracting in appearance.

U.S. Pat. No. 3,437,737, which issued on Apr. 8, 1969, is directed to a modular electrical outlet unit providing, perhaps, at least some possible ease in assembly/disassembly. Such a unit comprises a conventional outlet box, a back plate, and an electrical modular unit consisting of a unitary receptacle and a front plate. Connected to the modular unit at its rear is a vertically disposed back strap which has tension arms extending upwardly and outwardly toward the integral frontal plate. The arms each terminate with latching means which detachably engage with the upper and lower edges of the back plate which support the front plate at its top and bottom inside surface. Although the electrical module and front plate are somewhat readily assembled/disassembled by a snap-in arrangement, the back plate is still fastened, as conventionally done, by two screws to the outlet box.

Thus, such an outlet unit still requires two separate assemblies in installation. Moreover, when an installation is being made, the problem of potentially missing, dropped or lost, screws remains. Perhaps more importantly, however, the electrical outlet unit allows only limited vertical alignment of the face plate, in the event the outlet box is not properly aligned vertically, or is installed on a supporting stud that is not truly vertical. Thus, it would appear that the back plate can only be adjusted in its vertical disposition, and then only in one plane, as a result of the horizontal slots provided in the back plate.

U.S. Pat. No. 3,885,852 discloses outlet assemblies in which, according to the patentee, a plug receptacle or switch unit can be assembled with the outlet box without the use of screws. Thus, the outlet assembly comprises a generally octagonal-shaped outlet box with which is assembled a plug receptacle of corresponding generally octagonal symmetrical shape having an integral, circular-shaped face plate attached thereto. The outlet box is provided with opposed pairs of lock fingers each of which project rearwardly from the front edges of the outlet box and inwardly, away from the inside surface thereof. The receptacle is provided with alternating lands or channels. On assembly of the two members together the lands are engaged by the inner ends of respective lock fingers, holding the plug receptacle securely in the outlet box when it is fully inserted into the box. The two members can be readily disassembled, however, by rotating the two members in opposite directions to one another whereby to cause the lands to disengage the lock fingers, moving off the lands into respective channels whereby the lock fingers no longer hold the plug receptacle in the outlet box. The plug receptacle may then be readily withdrawn from the outlet box. Although the outlet assembly disclosed appears to lend itself to more universal use, e.g. with plug receptacles, switch and telephone units, the construction is believed limited to the octagonal shape disclosed. Thus, while it may be possible to alter the shape of the face plate to other than circular shape, the shape of the outlet box and associated unit cannot be altered. To do so, it is believed, would change the manner in which the invention operates.

In U.S. Pat. No. 4,059,328, which issued Nov. 22, 1977, there is disclosed a mounting structure for attachment to, for example, an outlet box for the mounting of an electrical receptacle. The mounting bracket or structure comprises an elongated bottom defined by elongated edges each of which is turned up providing a curved in position for clipping engagement with a corresponding ridge provided on the receptacle to be assembled therewith. The end bracket is further defined by vertically disposed leg portions located at the ends of the bracket, each of which is provided at its end with a horizontally disposed lug in which is provided an aperture for a screw fastener and a clip portion for engagement with the outlet box. Thus, the electrical receptacle, which apparently is also of novel construction, can merely be pushed into clipping engagement with the outlet box, once the mounting bracket has been clip mounted on the outlet box. This box is provided with ears at each end thereof which match up with the apertures in the bracket lugs for screw fastening of a cover plate on the receptacle. Although various modifications of the mounting bracket is shown, it appears that apertures must be provided in the bracket to accommodate screws in order to fasten a cover plate on the outlet box, if such is desired. More importantly, however, it appears that with the novel bracket structure providing clipping engagement with, for example, an electrical plug receptacle, the plug itself must be of novel construction. Otherwise the two members cannot be held together. The bracket will not, it is believed, provide clipping engagement with the electrical plugs believed more conventionally now used.

Despite the above inventions as disclosed in the prior art, the conventional electrical outlet assembly earlier disclosed is still in wide use. The prior inventions are believed, in some cases at least, to be too expensive to justify their being used, even though certain advantages may be realized. In other cases, among other concerns, the installation of the outlet boxes still requires the use of screw fasteners for attachment of the frontal plates to the outlet box. Thus, there is still believed to be a need for an electrical outlet unit not only of relatively simple construction but one which offers ease and convenience in assembly/disassembly, attendant with reduced labor cost, particularly in the installation of electrical distribution systems in commercial buildings.

SUMMARY OF THE INVENTION

A primary object of the invention is to provide means for detachably connecting a cover plate to an electrical outlet, or other, box without need for any tools.

Another object of the present invention is to provide a modular type electrical receptacle assembly offering quick connect/disconnect features between an outlet, switch, or junction box, and the cover plate connected thereto.

A further object of the invention is to provide an electrical receptacle assembly having only two components that need be assembled together.

A further object is to provide an electrical receptacle assembly in which the components comprising such can be detachably assembled together without need for any separate screw fastening means or tools.

A further object of the invention is to provide an electrical receptacle assembly useful as an outlet plug receptacle with snap-in features: the outlet plug or socket snaps into the cover plate unit; the cover plate unit with the socket contained therein snaps into the electrical outlet box.

A further object of the invention is to provide an electrical outlet assembly wherein the electrical outlet box can be installed on a framing stud so that the edges of the open front thereof are flush with the front planar edge of the stud and lie in essentially the same plane, making for more efficient operation and economies in dry wall installation.

A further object of the invention is to allow an electrician to pre-wire an entire house or other building structure when he roughs it in, putting all outlet plugs and switches or the like in at the same time, pushing them to the back of the outlet boxes so that such are out of the way for installation of the dry wall panels.

Another object of the present invention is to provide an electrical outlet unit or assembly which can be installed in commercial buildings and residential housing with greater efficiencies accompanied with reduced labor cost.

Another object is to provide an electrical receptacle assembly that offers better means for vertical alignment of the cover plate and providing such flush with the dry wall surface.

Still another object is to provide an assembly that can be more universally used in various applications in the providing of electrical wiring systems in a commercial building or residential structure.

A still further object of the invention is to provide an improved electrical outlet assembly or other electrical receptacle unit, while at the same time providing an electrical fixture which will be capable of Underwriter's approval and approval by Municipal or other government agencies in charge of wiring codes and ordinances.

Quite advantageously, an electrical receptacle assembly according to the invention can be more readily adjusted to walls of slightly different thicknesses, to sheetrock, i.e., dry walls, or paneling, compared to conventional screw fastened assemblies, to make the rear face of the face plate flush with the surface of the wall, etc. in which the assembly is installed.

Another advantage with an electrical receptacle assembly according to the invention is that such allows for better adjustment or alignment of the face plate to a vertical orientation, or flush with the wall surface, particularly where the outlet box has been imperfectly mounted on the stud or installed on a stud not vertically aligned.

Another advantage is that a receptacle assembly of the invention allows dry wall panels to be fully installed without need for first measuring off on the dry wall the location for cut-outs for an outlet box or the like, cutting such out, and then completing the installation. Use of receptacle assemblies according to the invention allows for cutting out the outlet box openings in the dry wall after installation, and all at one time.

A further advantage of an electrical outlet assembly of the invention is that such are somewhat safer for an electrician to work on, in terms of shorting-out.

A still further advantage of an electrical outlet assembly according to the invention is that the assembly is somewhat safer in the home with small children, as they cannot get to the electrical wiring by merely removing screw fasteners.

BRIEF DESCRIPTION OF THE DRAWINGS

Some of the features and advantages of the present invention have been set forth above, others will become apparent from a reading of the detailed description which follows hereinafter, taken in conjunction with the accompanying drawings in which:

FIG. 7 is a view in cross-section of a portion of the outlet box assembly shown in FIG. 6 taken at section line 7—7 looking down from the top, better showing the means detachably connecting together the cover plate unit and the outlet box;

FIG. 8 is a greatly enlarged cross-sectional view of the alignment catch provided on the cover plate unit shown more fully in FIGS. 2 and 6 of the drawing;

FIG. 9 is a view in perspective showing the cover plate unit and the tools used in disassembling the cover plate unit from the outlet box after the tools, one of which is shown in FIG. 10, have been fully inserted and the cover plate unit has been removed from association with the outlet box; and FIG. 10 shows one of the pair of tools used for disconnecting the toothed components of the detachable fastening means according to the broad aspects of the invention.

DETAILED DESCRIPTION OF THE INVENTION AND ITS PREFERRED EMBODIMENTS

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Figure 1:
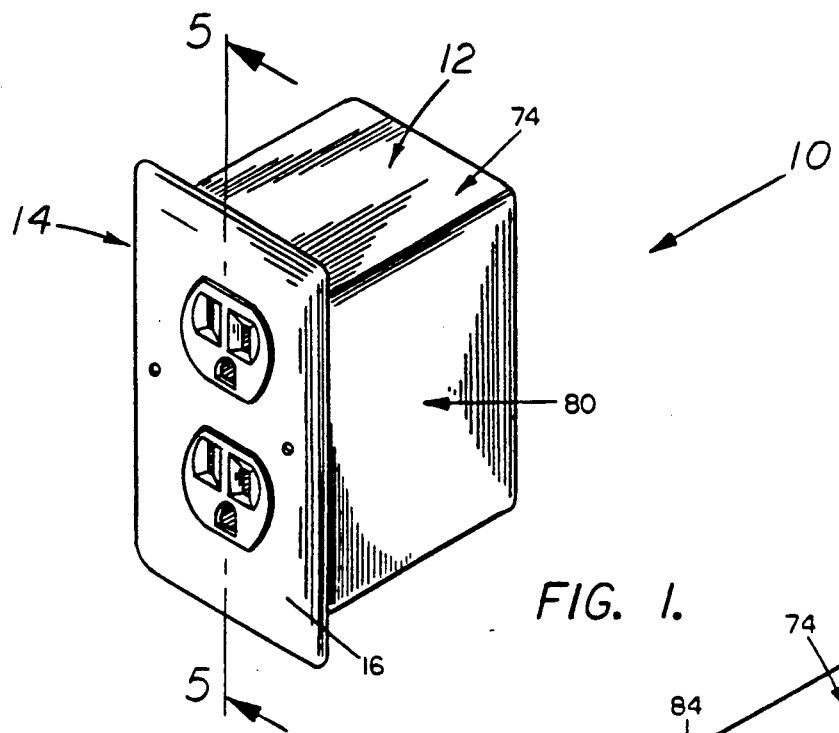
FIG. 1 is a view in perspective showing a modular type electrical outlet assembly according to the invention.
Figure 2:
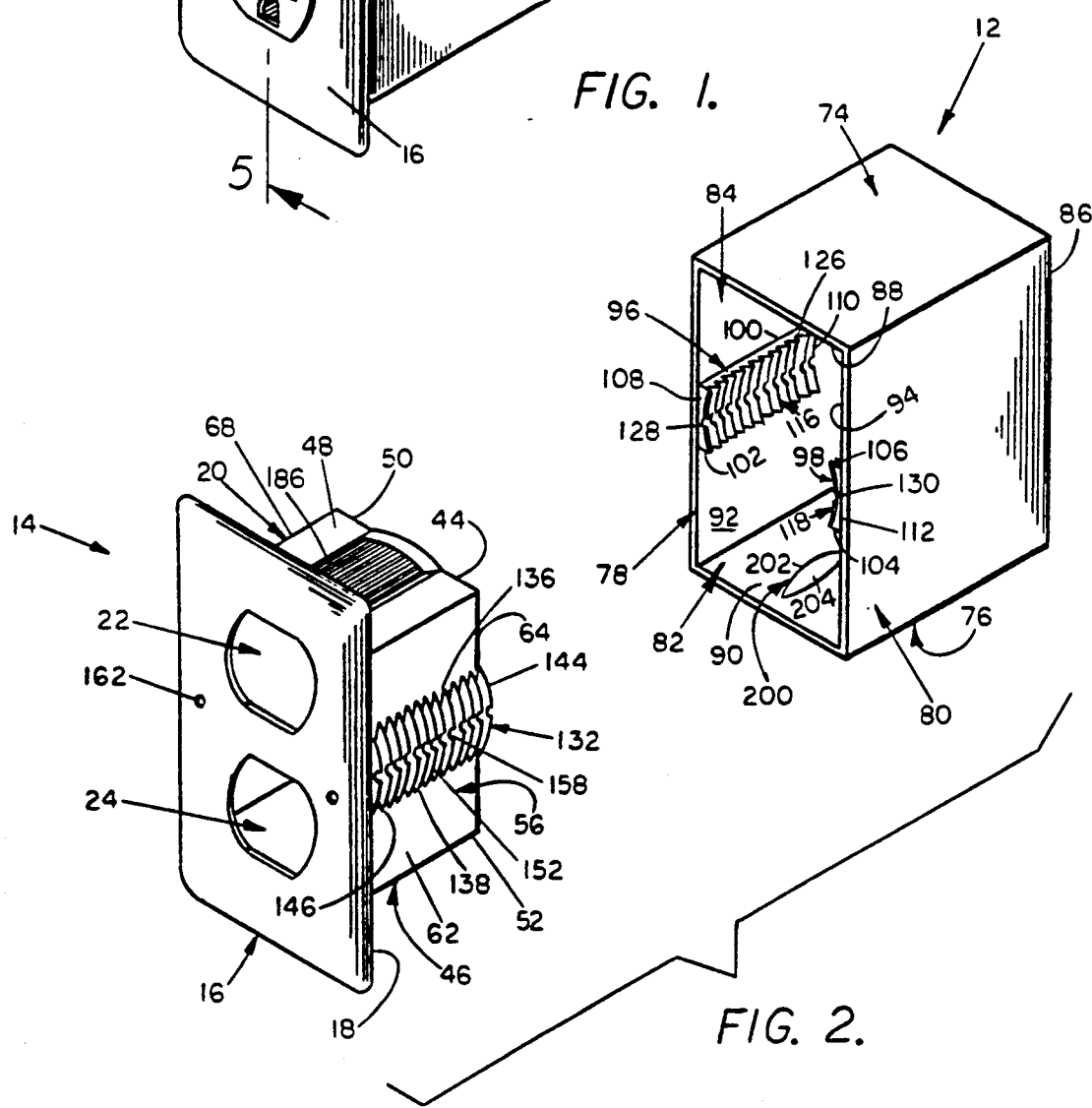
FIG. 2 is an exploded view in perspective of the modular outlet assembly of FIG. 1 showing the cover plate unit, and outlet box with the double outlet receptacle or socket removed.

Turning now to the drawing, there is shown in FIG. 1 thereof a modular electrical outlet assembly 10 comprising, in its basic aspects, in combination, an outlet box 12 of rectangular shape and a cover plate unit 14. The cover plate unit 14, as is shown in FIG. 2 comprises, in combination, a cover plate 16 having a rear planar surface 18, and a rectangular-shaped, elongated, parallelopiped or box-like member 20 integral therewith and extending perpendicularly outwardly a predetermined distance from the planar rear surface 18. The cover plate 16 is provided with spaced-apart apertures 22, 24, superposed one above the other, in usual fashion, for receipt, as is conventional, of respective electrical receptacle, or socket, projections 26, 28, which project, in usual manner, perpendicularly outwardly from the double socket receptacle assembly 30. The projections 26, 28 are provided with conventional female openings 32, 34 and 36, 38, respectively, for receipt of the male prongs (not shown) on the plugs of conventional electrical cords which supply electricity to electrically operated devices connected to the cords such as lamps, toasters, clocks, tools, etc. Openings 40, 42 are provided in the electrical sockets, as usual, for location of ground prongs provided on the electrical plugs.

Figure 3:
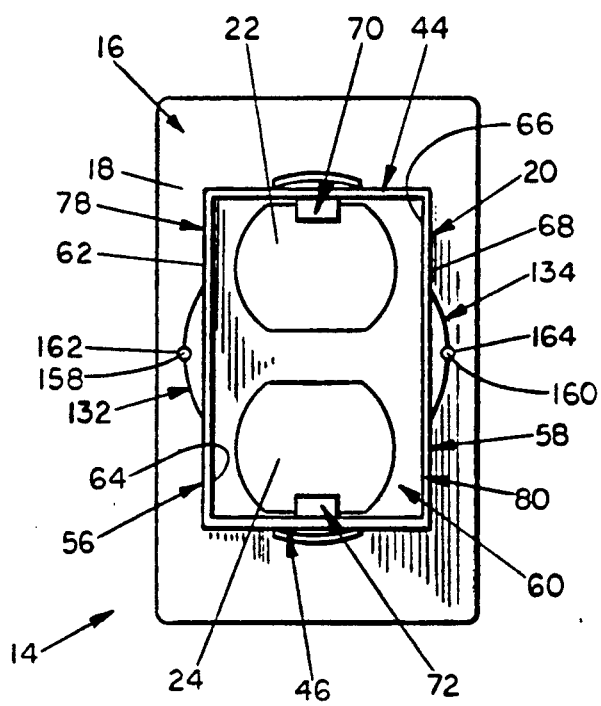
FIG. 3 is a rear view of the cover plate unit shown in FIG. 2.
Figure 4:
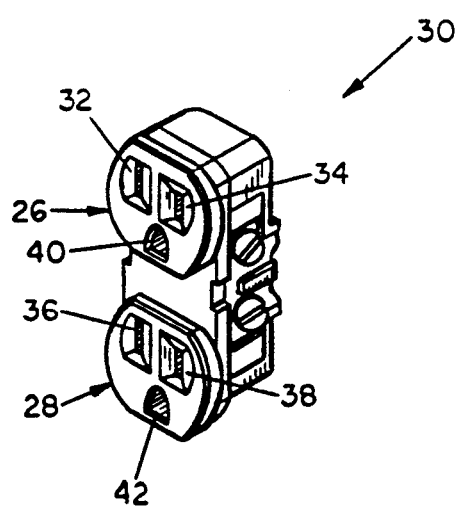
FIG. 4 is a perspective view of the double outlet electrical receptacle or socket used in the practice of the invention.

The box-like member 20 is defined by spaced-apart, parallel, upper and lower members or panels 44, 46, having outer and inner planar faces 48, 50, 52, 54, respectively, and parallel, spaced-apart side members or panels 56, 58 which intersect with the upper and lower members and define the rectangular-shaped, parallelopiped, internal cavity 60. The side members 56, 58, as shown in the drawings, are each defined by outer and inner planar surfaces 62, 64, and 66, 68, respectively. As shown in FIG. 3 of the drawing, the cavity 60 is open at its back end, the front end being closed in part by cover plate 16. Provided on the inner surfaces 50, 54, are catch members 70, 72, respectively, the purposes for which will be later more fully disclosed. These members are defined by forwardly extending spring elements or members which are located in planes extending inwardly into the cavity 60 from those planes defined, respectively, by end panels 44, 46 and are directed toward the rear surface 18 of face plate 16, as readily seen in FIG. 5. The catch members 70, 72 can be provided integral with the respective panels during manufacture, as will be hereinafter more fully disclosed, or such can be manufactured separately and then adhesively or otherwise attached to the panel surfaces according to conventional techniques. In this latter case, each catch member, if desired, can comprise a planar base member of, for example, square-shape, having the spring element depending therefrom in a plane at a suitable angle with the plane of the base member, to provide the desired spring tension. Such a catch member, if separately manufactured, can be made from a suitable piece of metal which is blanked and formed in one operation, or molded from suitable plastic materials, all according to well known techniques. Where manufactured separately, the catch members 70, 72 can be suitably secured to the inner surfaces of the upper and lower panels 44, 46 or in insets provided in such surfaces, as desired.

Figure 5:
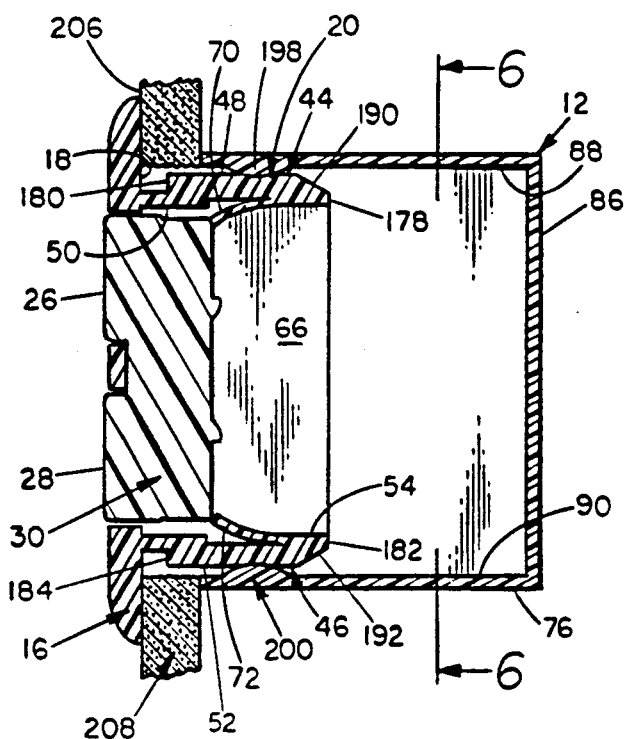
FIG. 5 is a longitudinal section of the outlet assembly as shown in FIG. 1 taken at section line 5—5, as installed in a dry wall, showing a portion only of the dry-wall.

The catch members 70, 72, as shown in the drawings, e.g., FIG. 3, should be located, in general, midway between the longitudinal side edges of the box-like member 20 defined by the end panels 44, 46 where such are connected to side members 56, 58. Nevertheless, this may depend somewhat upon the width of the box-like member 20, and the particular electrical unit being housed therein. In some cases, it may be desirable to have two or more catch members on each inner end surface. Thus, in that case, the catch members would be spaced apart equidistant across the width of the panels. Although the catch members 70, 72 shown in the drawings are of rectangular shape, this need not be the case. Such members can be of various shape, as desired, e.g. square-shaped, crescent shape, etc. The main thing is that such elements have a spring-like action and that such be long enough that, when in the operative position, each element presses against the back side of the double socket 30 located in the box-like member 20, as shown in FIG. 5, so as to maintain the front side of the socket in contact with the rear planar face 18 of the cover plate 16, and the projections 26, 28 projecting through the respective apertures 22, 24. Thus, the double socket 30 will be securely held in place when an electrical plug is inserted into one of the sockets as commonly done. Nevertheless, the catch members or spring elements 70, 72 need be short enough so that, when depressed, they will clear the back side of the socket, allowing the socket to be removed, if desired, from the box-like body member 20.

Outlet box 12, as shown in the drawings, is of rectangular-shape and is defined by parallel, spaced-apart, upper and lower planar panels 74, 76 and parallel, spaced-apart planar side walls 78, 80 which intersect perpendicularly with the upper and lower panels defining an internal, rectangular-shaped, parallelopiped cavity or storage area 82. The front edges of the upper and lower panels and sidewalls define a front opening 84 into cavity 82 which is closed at its back end by a vertically disposed planar member 86. This closure member may be fastened to the back edges of the upper and lower panels and sidewalls by various conventional means, or provided integral therewith, depending somewhat upon the particular material of construction.

Although not shown in the drawings, it will be readily appreciated that suitable openings can be provided in the outlet box so that the ends of electrical wiring (not shown), can be pulled into the outlet box by the electrician, as is now conventionally done. Openings can also be provided, if desired, in the box-like member 20 whereby the ends of wiring can be pulled for connection according to usual techniques to a plug socket 30, or other electrical device, e.g. a switch unit. The upper and lower panels 74, 76 and the sidewalls 78, 80 define inner planar surfaces 88, 90, and 92, 94, respectively.

Provided on planar, inner surfaces 92 and 94 are rectangular-shaped elongated members 96, 98 defined by parallel side edges 100, 102 and 104, 106, and end edges 108, 110 and 112, 114 (not shown), respectively. These members are defined by curvilinear, in this case concave, surfaces, referred to generally by reference numerals 116, 118. Elongated members 96, 98 are of identical construction and configuration; accordingly only one, namely member 98, will be more fully described hereinafter.

The concave surface 118 of elongated member 98, as will be appreciated by reference to FIGS. 2 and 7, is provided with a plurality of teeth 120 each of which extends inwardly into the concave surface 118 the same distance. The teeth 120 are each defined by side members 122, 124 which, as seen by reference to FIG. 7, intersect with one another, terminating in a knife-edge at the outer extremity of the concave surface 118. Side member 124 is defined by a plane which is disposed laterally perpendicular to the concave surface 118 and to the inner planar surface 94 of the outlet box. Side member 122 lies in a plane which tapers outwardly from side member 124 and is directed inwardly in the concave surface at a predetermined angle "A" which can vary somewhat but is most preferably about 30 degrees, as seen in FIG. 7. The side members 122 are parallel to one another and all are directed in the same lengthwise direction, toward end 114 of the elongated member. The teeth 120 are each of equal width at their base and are provided on the elongated member 98 in such a manner that the inner, or bottom, edge of side member 122 of a tooth intersects with the inner, or bottom, edge of the vertically disposed side member 124 of a next adjacent tooth nearer edge 112. The teeth 120 are parallel to one another, each extending laterally perpendicular to the lengthwise direction of he elongated member 98 and from one elongated side edge to the other. See, for example, the teeth 126 in elongated member 96, shown in FIG. 2.

The elongated members 96, 98 are each provided with elongated grooves 128, 130, respectively, which extend the length of such members and lie midway between, and parallel to, the elongated side edges of each such member. These grooves extend inwardly into the respective concave surfaces 116, 118 and, most preferably, for a predetermined depth at least as great as that of the said teeth, the reason for which will be made more clear hereinafter. Although the grooves 128, 130 are shown in the drawings to have a rounded, i.e. semi-circle, cross-section, the cross-sectional shape of the grooves can be of other cross-sectional shapes, as desired, e.g. square, triangular, etc.

The elongated members 96, 98 can be integral with the surfaces 92, 94 or separately manufactured, as desired. Such will depend somewhat upon the method of manufacture of the outlet box and its material of construction. The outlet box 12 can be manufactured of metal as now conventionally done, but without need for providing the fastening flanges or ears. In such a case, the elongated members 96, 98 can be molded from suitable plastic compositions according to conventional technique, the concave surface, teeth and groove being all provided in that member during the molding. Such a molded elongated member can be provided with a planar bottom surface for placement against and fastening to the inner planar surfaces 92, 94 of the outlet box at the proper locations. The elongated members 96, 98 can be fastened to these surfaces by various known means; however, desirably the bottom surfaces will be fastened to the inner surfaces of the outlet box by suitable adhesive to provide a permanent bond therebetween.

Most desirably, however, the outlet box will be provided of a plastic composition. Various such compositions now known will be found suitable, e.g. a polyvinyl chloride composition. With the outlet box being molded, e.g., injection molded according to well-known techniques, the elongated members can be provided integral, if desired, with the inner surfaces 92, 94. Or, the elongated members can be separately provided and adhesively fastened to the inner surfaces, as desired. In this case, insets may, if desired, be provided in the inner surfaces for location of the elongated members.

Figure 6:
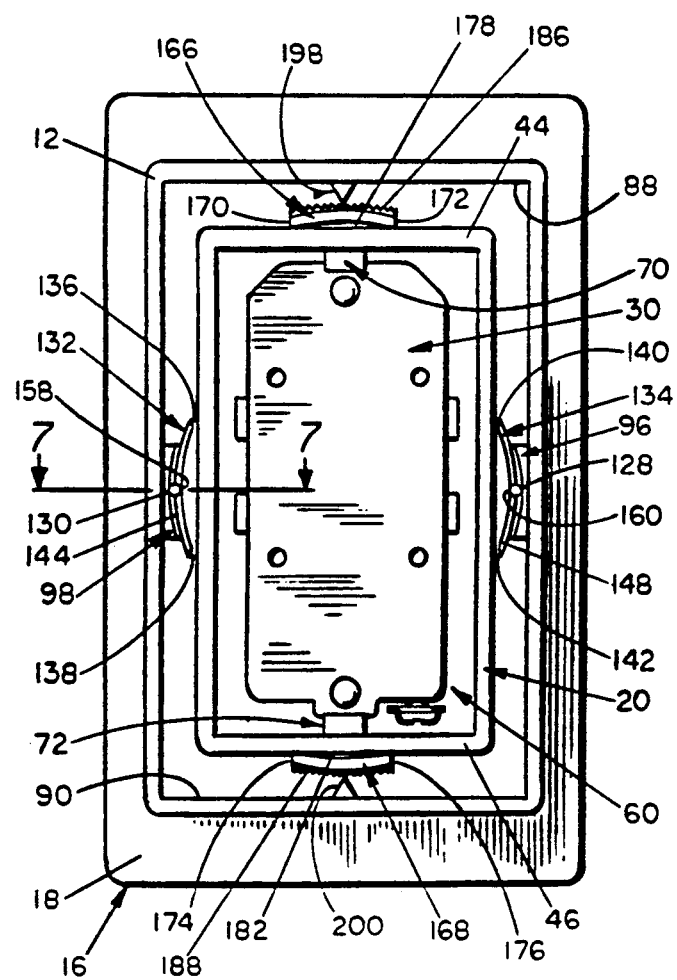
FIG. 6 is a rear cross-sectional view of the outlet assembly shown in FIG. 5 taken at section line 6—6 but with the wall not being shown therein for sake of clarity.

On the outer planar surfaces 62, 68 of the box-like member 20 there are provided, respectively, elongated members 132, 134. These members, as shown in FIGS. 2 and 6, are each defined by curvilinear outer surfaces, in this case convex surfaces. The elongated concave members 132, 134 are further defined by parallel longitudinal edges 136, 138 and 140, 142, and end edges 144, 146 and 148, 150, respectively (end edge 150 not being shown in the drawings.) These elongated members are identical in construction; accordingly, only elongated member 132 will be more fully described.

As will be shown more clearly by referring to FIGS. 2 and 7, a plurality of parallel teeth 152 are provided in the convex surface of elongated member 132. These teeth are each of equal width at their base and are defined by planar side members 154, 156. The side member 154 is defined by a plane perpendicular to outer planar surface 62 of the box-like member 20. Side member 156 intersects with side member 154 at the outer extremity of the convex surface forming a knife edge, as shown in FIG. 7, and tapering outwardly from side member 154 at a predetermined angle and inwardly into the convex surface. The side members 156 lie in parallel planes and are each disposed in a direction opposite to that of the planar side members 122 of the teeth 120. Thus, the side members 154, 156 of teeth 152 are so oriented relative to the side members 122, 124 of teeth 120 that, when the cover plate unit 14 and outlet box 12 are in operative engagement with one another, as shown in FIG. 7 and later more fully disclosed, a planar side member 124 will be in juxtaposition to and in contact with a planar side member 154. And, a side member 122 will be juxtaposed to and in contact with a side member 156. The angle "B" made by the intersection between side members 154, 156 where angle "A" is 30 degrees, will also be 30 degrees. Nevertheless, these angles can vary somewhat, the important consideration being that such angles are the same. The angle between the side members of one tooth e.g. side members 154, 156, and that formed by the side member of the other tooth at its base e.g. side member 122, will be a right angle, as will be appreciated by reference to FIG. 7.

The teeth in the opposed elongated members, when the cover plate unit 14 and outlet box 12 are in assembly with one another, can be of equal size, if desired. Nevertheless, it is preferred that the teeth 152 in the elongated members 132, 134 having a convex surface be somewhat greater in size, i.e., in depth than teeth 120. This will allow somewhat greater flexibility in such teeth and make for greater ease in assembling the cover plate unit with the outlet box, later more fully described. Also, the width of teeth 152, along with the depth thereof will desirably be such that a tooth 152 will be located only in predetermined spaces between next adjacent teeth 120. Thus, a tooth 152 will be located in the space between the first two next adjacent teeth 120, leaving the space between the next two adjacent teeth 120 empty, etc. along the length of the elongated members, as shown in FIG. 7. Thus, where the side members of the teeth intersect at angles A=30 degrees, B=30 degrees, as earlier disclosed, the base of the teeth 120 will desirably be about 0.025 inches and that for teeth 152 will desirably be about 0.050 inches. In other words, the horizontal distance between the planar side members 124 of next adjacent teeth 120 will be about 0.025 inches and that between next adjacent planar side members 154 of teeth 152 will be about 0.050 inches. These distances can vary somewhat, however, depending somewhat on the desired flexibility of the teeth. In general, the more flexible the teeth in the opposed elongated members, relative to one another, the greater ease there will be in assembling the cover plate unit with the outlet box but also the less tightly interlocked will be the two members.

Turning to FIG. 6, it will be readily appreciated that the width of the elongated members 132, 134, i.e. the convex surfaced members, is substantially greater than that of elongated members 96, 98. While such is highly preferred, as later made more clear, this need not necessarily be the case. In the preferred embodiment of the invention, the elongated members 96, 98 will be about 0.55 inches wide from one parallel elongated edge to the other, and the width of elongated members 132, 134 about 0.95 inches, the sidewalls of the outlet box being about 4½ inches, as is now conventionally provided. The elongated members should be located, for best performance, midway between the end panels of the outlet box and box-like member 20 on the cover plate unit. This unit can vary somewhat depending upon the dimensions of the opposed elongated members, as shown in FIG. 6. The main factor is that when the outlet box 12 and cover plate unit 14 are in assembly with one another, the convex members need be in pressing engagement with the concave members so that the teeth in each of such members are engaged and interlocked with one another, as shown in FIG. 7. Nevertheless, the convex member should not press against the concave member so as to prevent or hinder, the assembly of the cover plate unit with the outlet box.

As will be seen by reference to FIGS. 2 and 6, the elongated members 132, 134 are provided with grooves 158, 160, respectively, which extend the length of the elongated members. These grooves are located midway between the parallel elongated edges of the elongated members and are parallel thereto. The grooves 158, 160 are provided in the convex surfaces the same predetermined depth and at least the depth of the teeth in such members. As in the case of the grooves 128, 130 provided in the elongated concave members located in the outlet box, the grooves 158, 160 can be of various cross-sectional shape. Most desirably, however, the cross-sectional shape of the grooves 158, 160 will be semicircular, as shown in FIG. 6. Thus, when the cover plate unit 14 and outlet box 12 are in assembly with one another the grooves in the opposed convex and concave surfaces will mate with one another forming an elongated, cylindrical-shaped opening or tunnel.

The cover plate 14, as will be readily seen from FIG. 3, is provided with two spaced-apart openings 162, 164 which are located on a horizontal plane parallel to the bottom edge of the cover plate and which extend through the cover plate and communicate with the internal cavity 82 provided in the outlet box 12. These openings, and this is of critical importance, are so located on cover plate 16 that each opening is in direct opposition to and acts as an extension to, the tunnel earlier mentioned. These openings need not be circular-shaped as shown, and can be of other cross-sectional shape, if desired, dependent somewhat upon the cross-sectional shape of the resulting tunnels formed by the mating grooves in the opposed elongated members. Although less preferred as later explained, the openings 162, 164 can even be of a different cross-sectional shape and dimension than the resulting tunnels provided such shape allows a tool, as later disclosed, to be inserted therethrough to enable disassembly of the cover plate unit from the outlet box.

At each end of the box-like body member 20, there is provided an elongated alignment member referred to generally by reference numerals 166, 168, on the outside surface of the end panels 44, 46, respectively. These alignment members 166, 168 are disposed perpendicular to the rear planar surface 18 of the cover plate 16 and are defined by parallel elongated side edges 170, 172 and 174, 176, respectively, and parallel end edges 178, 180 and 182, 184, respectively. The outer surfaces of the alignment members are provided with a plurality of teeth 186, 188 which, most desirably, extend from the back ends of the respective members toward the respective front ends terminating just short thereof at surfaces 190, 192 which taper downwardly toward the front end edges 178, 182. The reason for these tapered surfaces will soon be made clear.

The alignment members 166, 168 are each of identical dimension and construction and only one will be more fully described hereafter. As will be more readily seen by reference to FIG. 8, the teeth 186 in alignment member 166 are parallel to one another and are each defined by planar side members 194, 196 which intersect with one another forming a knife edge at their outer extremity. The side members 194, 196 diverge from one another at equal angles inwardly and terminate at equal distances at the base of the tooth. The teeth are each of the same length and terminate at the back edge of the tapered surface 190 (FIG. 5). The teeth 186 preferably define an outer convex surface, as shown in the drawings, but such is not absolutely necessary. The width of the alignment means can also vary somewhat; however, a width of about 0.9 inches has been found suitable in the practice of the invention. A tooth having a planar side member about 0.024 inches wide, a 60 degree angle groove between next adjacent teeth and a horizontal distance of about 0.028 inches between next adjacent knife edges will be found satisfactory for the intended function of the alignment means.

The alignment members 166, 168 can be provided integral with the respective outer faces 48, 52 or separately manufactured depending somewhat upon the material of construction of the cover plate unit 14. If produced separately, the alignment members will be provided with a planar bottom surface for location directly against, and permanent connection to, the respective planar outer faces 48, 52, according to various conventional techniques. Thus, the alignment members can be adhesively fastened to the outer faces, if desired. Preferably, however, the cover plate unit 14 will be provided of a suitable plastic composition, rather than of metal as now commonly provided. These plastic compositions can include various well known components to provide a cover plate of any desired color or decorative effect. The cover plate units, if of plastic, can be provided by various molding techniques, e.g., injection molding, as desired. In such a case , the alignment members 166, 168 can be, if desired, provided integral with the end panels 44, 46, during manufacture. The alignment members should be centrally disposed between the longitudinal edges of the box-like member 20. As shown in the drawings, the outer surfaces of the alignment member each define a convex surface. Such will provide somewhat greater ease in vertically orienting the cover plate, relative to the outlet box and the floor of the room in which the unit is installed.

In opposition to the alignment members 166, 168, there are provided on the inner end surfaces 88, 90 of the outlet box 12 elongated catch members 198, 200, respectively. These catch members are of equal shape and dimension and project outwardly from the respective inner surfaces 88, 90 of the outlet box 12 into the cavity 82. The catch members are located midway between the longitudinal edges of the upper and lower panels 74, 76 and extend in lengthwise direction of the outlet box from a point closely adjacent to the edges of the open front of the outlet box, but spaced therefrom about a half inch or so, about the thickness of a conventional dry wall panel. As seen by reference to FIG. 2, the elongated catch member 200 is defined by side members 202, 204 which intersect at their outer edges defining a knife edge. The side members 202, 204 diverge from said knife edge in equal angles, e.g. about 30 degrees from a vertically disposed plane passing through the said knife edge and terminate at the inner surface 90 of the outlet box. The side members 202, 204 are bowed outwardly and then inwardly from front-to-back of the catch member, as is shown in FIG. 2. Thus, in the preferred aspect of the invention a knife edge that is rounded from front-to-back is provided which allows gradual entry of the respective knife edges into the space between next adjacent teeth provided in the alignment members 166, 168, when the cover plate unit and outlet box are assembled together. The height of the catch members 198, 200, i.e., the outer most distance the knife edge is located from the respective inner surfaces 88, 90, can vary somewhat, depending upon the height of the box-like member 20 and the thickness of the alignment members. The important consideration is that, when the cover plate unit 14 and outlet box 12 are assembled together the knife edges will travel along a desired elongated groove between next adjacent teeth 186 in respective alignment members without binding, so that the cover plate unit can be pushed into the internal cavity 82 of the outlet box 12 the desired distance.

The cover plate unit 14 and outlet box 12 can be manufactured of various materials as now conventionally done, e.g. metal and plastic. Preferably, however, these components will be manufactured of a suitable plastic composition by conventional injection molding techniques as such will offer not only ease, but economics, in manufacture. And, such manner of manufacture will allow the various toothed members and catch members to be provided integral to the cover plate unit and outlet box. The box-like member should protrude outwardly from the inner surface 18 a distance less than the length of the outlet box from front-to-rear. The greater the depth, however, of the outlet box, the greater the member of teeth that can be provided in opposed convex-concave surfaces. Thus, the better connection there will be between the assembled components. Nevertheless, a depth of about 1-1½ inches will be found, in most cases, quite satisfactory. The opposed toothed elongated members if of about the same length will provide good interlocking engagement between opposed convex/concave members.

In the practice of the invention, an outlet box 12 of the invention is installed by an electrician on a stud (2"×4") or other appropriate framing member so that the front edges of the outlet box are flush with the front edge of the stud. This is done prior to the installation of wallboard, paneling, or other wall surfacing operations. Although not shown in the drawings, the outlet box 12 can be provided with various openings or means, as now conventionally done, for fastening of the outlet box to the framing member. For example, planar, spaced-apart flange members extending in lengthwise direction of the outlet box can be provided which extend vertically upwardly from one or the other longitudinal edges. The flanges will each be provided with an opening for insertion of a screw fastener or nail which can be screwed, or driven, into the framing member. Preferably, however, a single such flange will be provided midway between the front and back edges of the outlet box whereby the outlet box can pivot somewhat in a counter-or clockwise direction if needed, the reason for such later being made clear. The electrical wiring is then drawn by the electrician into the outlet box through an opening provided in the outlet box. One or more openings (not shown) can be provided in the outlet box during manufacture, e.g. in knock-out form, as usual, the electrician removing the knock-out portion during installation. The ends of the wiring drawn into the outlet box are then connected by the electrician, according to usual technique, to the double plug receptacle 30 provided. This plug receptacle is of conventional design except that it has no ears protruding from its ends for insertion of screws, to fasten the plug to a conventional outlet box. Conventional double plug receptacles on hand can even be used in the outlet box of the invention by merely removing the ears. This can be done by the electrician by bending and breaking the ears off from the ends, if need be; however, more desirably, such will have been previously removed from the plug ends by cutting them off with a suitable cutting tool. The electrician, after wiring the socket, pushes it back into the cavity 82 of the outlet box so as not to interfere with installation of the dry wall or other wall member.

Subsequent to installation of the dry-wall panels, the sheetrocker, i.e., the dry wall installer, then cuts out all the openings in the wall members, to reveal the front opening of each of the outlet boxes installed and to provide access by the electrician to the already wired double socket. Then, the electrician later comes along, drawing out the wiring connected to each double socket a suitable amount whereby the socket 30 can be snap-fastened into the box-like member 20 of the cover plate unit, the receptacle projections 26, 28 then protruding out the openings provided in the face plate, as shown in FIG. 5. The cover plate unit 14 is then detachably connected to the outlet box. This is accomplished by first lining up the cover plate unit 14 so that it is vertically oriented, i.e., the plane vertically bisecting the two superposed receptacle projections is perpendicular to the plane defined by the floor of the room in which the electrical outlet is being installed. And, the elongated convex members on the outlet box 20 are lined up with opposed elongated concave members on the outlet box. The cover plate unit 14 is then pushed inwardly partway into the cavity 82 defined by the outlet box just sufficient to engage the front teeth in the elongated concave members in the outlet box and the catch members 198, 200 in the outlet box in a groove between two teeth provided on the alignment members 166, 168. The engagement of catch members 198, 200 with the alignment members will be somewhat gradual, the knife edges on the catch members riding on respective tapered surfaces 190, 192. At this time, the vertical alignment of the cover plate 16 is checked again. If the cover plate 16 is vertically aligned as desired, the cover plate unit 14 is then pushed inwardly until the inner planar surface 18 contacts the outside planar surface 206 of the dry wall panel 208, as shown in FIG. 5. The catch members 198, 200 travel along the grooves in the alignment members in which they were first engaged insuring that the vertical alignment is maintained. As the cover plate unit is pushed inwardly, the teeth 152 are flexible enough to ride over the teeth 120 and then to interlock with one another whereby to prevent the cover plate unit from being withdrawn. It will be appreciated that, by reference to FIG. 7, on pushing the cover plate unit 14 into the outlet box 12, the tapered side members of the teeth 152 contact the tapered side members of the teeth 120 whereby to allow the teeth 152 to slide over the teeth 120, and the cover plate unit 14 to be pushed into cavity 82 until the inner surface 18 of the cover plate is stopped by the outer planar surface 206 of the dry wall panel. In the event that outlet box 12 is not installed on the framing member in a truly vertical position, its ability to pivot somewhat, as earlier described will allow the cover plate inner surface to still interface with the wall panel surface so as not to leave any gaps therebetween.

If, on checking the vertical alignment of cover plate 16, on partially pushing the cover plate unit into the outlet box, the electrician discovers that the cover plate 16 is not vertical, the orientation of the cover plate can then be adjusted so as to make it vertical. Thus, the cover plate unit 14 can be withdrawn somewhat and reoriented clock-or counterclockwise and partially pushed into the outlet box cavity again. The tapered surfaces 190, 192 allow this orientation to be readily accomplished and without complete disengagement of the teeth in the elongated members from one another. On such reorientation, the catch members 198, 200 will find themselves aligned with another groove between the teeth on the alignment members, after which the cover plate unit is pushed all the way into the outlet box cavity. It will be appreciated that the orientation of the cover plate relative to the vertical is facilitated somewhat by the somewhat greater width convex surfaces as such provides a longer groove for the teeth 120 to travel in while the cover plate is being oriented in vertical disposition. Importantly also, as the teeth 154 travel in a groove between teeth 122, this helps to maintain the vertical relationship of the cover plate relative to that of the plane of the wall. Thus, it will be appreciated that the cover plate unit can be oriented in three vertical directions relative to the wall surface, i.e., in and out in a pivotal manner such as to be flush with the wall surface, clockwise and counter clockwise in a vertical plane, and about its longitudinal axis to be made flush with the wall. Thus, a receptacle unit according to the invention can better accommodate incorrectly installed outlet boxes, studs that are not truly vertical, and unevenness in wall surfaces, as well as dry walls of slightly different dimension, one panel to another.

If later it is desired that the cover plate unit 14 be removed from the outlet box 12, this disassembly can be readily and easily accomplished. This is, in general, accomplished by a tool 210 such as is shown in FIG. 10. Tool 210, as shown in the drawing, comprises an elongated body member 212 and a circular-shaped gripping or handle means 214 at one end. The body member can be of any shape desired dependant somewhat upon the shape of the tunnel provided between the opposed elongated toothed members. Preferably, it will be of a circular-shaped cross-section, the same as the tunnel, as this allows some ease and economics in production of such a tool. The diameter of the body member will depend somewhat upon the diameter of the resulting cylindrical-shaped tunnel between the opposed elongated members. In any event, the diameter of the tool 210 should be sufficiently greater than that of the tunnel, to expand the diameter thereof when the tool is inserted, as later made clear, whereby to cause the teeth in the respective elongated members to be sufficiently disengaged from one another, so that the cover plate unit can be withdrawn from the outlet box cavity 82. The outer end of the tool 210 is provided with a conical-shaped end 216 facilitating the use of the tool as hereinafter further disclosed. The tool 210 need not have a conical-shaped end although this is preferred where the body member 212 is of circular shape. The main thing is that end 21 be tapered to a point, which desirably is rounded so as not to be a sharp point thereby to prevent possible injury to a user, facilitating its movement in somewhat gradual fashion into the tunnel, and separation of the interlocked teeth, as shown in FIG. 7. To accomplish the disengagement of the interlocked teeth, a tool 210 is inserted into each of the openings 162, 164, as seen in FIG. 9, the conical end thereof being inserted first as seen in FIG. 7. Then, each tool 210, is pushed inwardly into the circular-shaped tunnel formed by the mating grooves on the elongated members. As the tools are pushed inwardly, the tools being of somewhat larger diameter than that of the circular-shaped tunnel, cause the teeth in the associated elongated members to be separated from one another. The teeth in the respective elongated members need not necessarily be entirely no longer in engagement with one another, e.g., at their tips. Disengagement need be just sufficient that they are no longer interlocked, the flexibility of the teeth at their outer extremities allowing the teeth in one member to ride over the teeth in the other member. That being the case, the cover plate unit can be then withdrawn from the outlet box by pulling outwardly in a direction perpendicular to the wall in which the cover plate unit has been located. Thus, the electrical wiring is drawn through the outlet box a sufficient amount to allow the electrical socket to be removed or replaced, if such is desired. This is readily accomplished by depressing the spring members or elements by a suitable tool such as the flat head of a screw driver.

As used in this application, the terms "top" and "bottom," "upper" and "lower," "vertically" and "horizontally," etc. with respect to the various components relate to the drawing orientation and are not used for descriptive purposes. These terms are not to be construed as limiting since the outlet box or the like and the cover plate unit or the box-like structure attached thereto can be oriented in various manner other than shown.

Although the invention has been more particularly disclosed with respect to an electrical outlet unit, i.e., one having a receptacle plug socket therein, it will be appreciated by those skilled in the art that such is not so limited. The "receptacle plug socket" can be replaced by various other modular units such as wall mounted switches, terminal blocks, light-supporting fixtures, etc. The "electrical outlet box" can be, instead of a receptacle outlet box, a switch box, electrical surface entrance block, fuse block box, etc.

Furthermore, it will be appreciated that just as the invention lends itself to applications other than as an outlet assembly, various cover or face plate configurations can be provided as desired. Rather than having two apertures for a double outlet wall receptacle as more fully disclosed herein, the face plate can be provided with additional, or various shaped, openings, if desired, as now conventionally provided. Thus, for example, the face plate can be provided with a single rectangular-shaped opening for a toggle switch, when the assembly is used to house a switch unit. Or, it can be provided with a single, circular-shaped opening for a rotary operated dimmer switch. The face plate need not be of rectangular-shape. It can be, for example, circular or oval-shaped, if desired. Thus, it will be appreciated that the assembly of this invention offers universal application in the electrical field. In most uses, only a change will be required in the particular number, type or size of apertures that need be provided in the cover plate.

Moreover, the elongated means for detachably connecting the cover plate unit to the outlet box, as disclosed herein, can be used in various other applications. For example, such a connecting means can be used wherever a closure member is to be detachably connected to a box-like, or other shaped, storage unit. Or two members of tubular shape, one of somewhat smaller diameter than the other, can be detachably connected together. Moreover, the concave/convex members need not necessarily in all cases be of rectangular shape, as disclosed more fully herein. In some applications an oval or circular-shaped convex/concave member will be found suitable. Also, it is not essential that the elongated fastening member on the cover plate have a convex surface, while that provided on the outlet box have a concave surface. The reverse will also be found satisfactory, i.e., the elongated member on the cover plate unit can have a concave surface, if desired, and that on the outlet box a convex surface. The main consideration is that two members be provided, one having a convex surface and the other a concave surface, and that such each be provided with a plurality of teeth having the shape shown, and oriented in opposite directions as shown in FIG. 7. Thus, when the two members are in pressing engagement with one another and one member is moved in a lengthwise direction relative to the other, such members will function in rack and pinion fashion. The two members can be moved in lengthwise direction together so that the teeth in one slides over the teeth in the other. Nevertheless, the two members cannot be moved in lengthwise direction apart as the teeth in one member are trapped by those in the other, much like a pawl which drops into a ratchet wheel so as to prevent reversal of motion. Although less preferred, the elongated concave/convex toothed members need not necessarily be provided in all cases with a groove enabling insertion of a tool, as disclosed, for separation of the teeth from one another and unlocking of the two members. In some cases there may be no need, or desire, to ever disassemble two members fastened together. Thus, if the two members are to be permanently interlocked with one another, the toothed members can be provided without grooves therein. The toothed members can also be provided without grooves in electrical boxes, as disclosed herein. Nevertheless, in separation of the two, the teeth may be so damaged, at least in some cases, such as to prevent their later functioning to provide interlocking engagement. In some cases at least, it may be desirable for the grooves to be rectangular in shape so that when assembled a slot is provided. Such will better ensure that a tunnel remains for the tool 210 in cases where vertical alignment of the coverplate unit may be such that a circular-shaped groove in one member would not match up with a circular-shaped groove in the other. Nevertheless, it will be appreciated that even if the grooves do not mate, as desired, the tool 210 can still be inserted and such will ride along the groove provided in the elongated member on the box-like member 20. The teeth in the elongated members located on the outlet box will, in general, be flexible enough as to allow the tool to ride over them without much difficulty.

Accordingly, it will be appreciated that the invention is not to be limited to the exact forms of the embodiments shown in the figures of the drawings, for obviously changes may be made in the construction for specific applications, all within the scope of the following claims.

What I claim is:

1. Means for detachably connecting together two members disposed in opposition to one another and in pressing engagement with one another, said means comprising:

(a) a first member having a concave surface, a plurality of equal width, parallel teeth being provided in said concave surface each of which projects inwardly from said surface the same predetermined distance, each said tooth being defined by a first side defined by a plane perpendicular to said concave surface and a second side intersecting said first side at a predetermined angle and tapering outwardly therefrom, said second sides being parallel to one another and extending in the same direction from the vertical, an elongated groove being provided in said concave surface perpendicular to said plurality of teeth and extending the extent of said concave surface and midway therebetween, said groove extending inwardly in said concave surface a predetermined distance less at least as great as that of the said plurality of teeth: and (b) a second member having a convex face complementary to the said concave surface of the first said member, a plurality of equal width, parallel teeth being provided in said convex face each of which projects inwardly therein the same predetermined distance, each said tooth being defined by a first side defined by a plane perpendicular to said convex surface and a second side intersecting said first side at a predetermined angle and tapering outwardly therefrom in a direction inwardly in said convex surface, said second sides each extending in the same direction from the vertical but opposite from that of the second sides in the first said member, an elongated groove being provided in said convex surface perpendicular to said plurality of teeth and extending the extent of said convex surface and midway therebetween, said groove extending inwardly into said convex surface a predetermined distance less at least as greater as that of the said plurality of teeth, and being of the same shape and dimensions as that of the said elongated groove in the said concave surface, whereby when said first and second members are in operative engagement with one another the concave and convex surfaces mate with one another and the teeth on one said member interlock with the teeth on the other said member preventing the said elongated members from being separated one from the other in opposite directions.

2. Means for detachably connecting two members together according to claim 1 wherein the said first and second members are each rectangular-shaped, elongated members defined by parallel, elongated edges and of a predetermined length defined by parallel end edges, said grooves in the concave and convex surfaces being located midway between the said elongated edges and extending the length of the said concave and convex surfaces.

3. Means according to claim 2 wherein each said groove is defined by the radius of a circle so that when the two elongated members are in operative engagement with one another the cross-sectional shape made by the grooves in opposition one to the other is circular.

4. Means according to claim 1 wherein the said detachable connecting means further comprises tool means enabling said members to be separated from one another, said tool means being capable of disengaging the interlocked teeth on the said two members.

5. Means according to claim 4 wherein the said tool means for disconnecting the said members one from the other comprises an elongated member of a predetermined length greater than that of the said grooves provided in the said concave and convex surfaces, said tool means having a circular-shaped cross-section and being defined by first and second ends, one of said ends being defined by a conical shape and tapered to a point, the circular shape defined by said tool member being of a somewhat greater predetermined diameter than the diameter of the circle defined by the mating grooves.

6. Means according to claim 5 wherein the other of said ends of the tool means defines a circle for insertion of one's finger for gripping the tool means.

7. An assembly for containment of various items as desired comprising in combination:

(a) a storage unit defining an internal storage compartment of predetermined size and shape, said storage unit being defined by inner and outer surfaces defined by front and back edges, a front end defined by the said front edge and a back end defined by the said back edge, at least the front end being in a plane perpendicular to said inner and outer surfaces and open for placement of the said items in the storage compartment;

(b) a cover plate unit for detachable assembly with the said at least open front end of the storage unit, said cover plate unit having a cover plate having an inside planar surface and being of a dimension greater than that of the said open front planar end of the storage unit whereby on assembly of the two members together the said open front end is contacted by said inside planar surface and is completely covered;

(c) spaced apart, elongated members in opposition to one another each defining an inner planar surface parallel one to the other and extending outwardly from the said inside planar surface of the said cover plate and perpendicular thereto, each said member including an outer curvilinear surface, a plurality of equal width, spaced-apart, parallel teeth being provided in each said curvilinear surface extending inwardly the same predetermined distance, each said tooth being defined by a first side defined by a plane perpendicular to said inner planar surface and a second side intersecting said first side at a predetermined angle and tapering outwardly therefrom in a direction toward said inner planar surface, the said second sides being parallel to one another and extending at the same angle relative to the lengthwise direction of said elongated member;

(d) a second pair of elongated members of the same length as the elongated members provided on the cover plate and being provided on and connected to the said inside surface of the said storage unit and in opposition to one another, each of said elongated members being defined by parallel, elongated edges and a curvilinear surface complementary to that curvilinear surface of the elongated members provided on the cover plate, a plurality of equal width, parallel teeth being provided in said curvilinear surface each of which extends inwardly from said surface the same predetermined distance, each said tooth being defined by a first side defined by a plane perpendicular to said curvilinear surface and a second side intersecting said first side at a predetermined angle and tapering outwardly therefrom in a direction inwardly in said curvilinear surface, said second sides each extending in the same lengthwise direction opposite to that of the second sides of the teeth provided in the first mentioned curvilinear surface, (e) an elongated groove being provided in the said curvilinear surface of each said elongated member midway between the said parallel edges thereof and extending inwardly a predetermined distance less equally in the said plurality of teeth;

the teeth on the cover plate interlocking with those provided on the storage unit on assembly of the cover plate with the storage unit, whereby the cover plate cannot be separated from the storage unit by pulling outwardly on the cover plate.

8. A modular electrical receptacle assembly comprising in combination:

(a) an outlet box having an internal cavity having an open front and being defined by spaced-apart, planar, parallel, inner surfaces of vertically disposed side walls provided in opposition to one another;

(b) a first pair of elongated members each defined by parallel elongated edges being provided on and permanently attached to respective said planar inner surfaces of the outlet box, each said member defining an elongated curvilinear surface, a plurality of parallel teeth being provided in each said curvilinear surface, each said tooth defined by a first side defined by a plane perpendicular to said curvilinear surface and a second side intersecting said first side at a predetermined angle and tapering outwardly therefrom in a direction toward said curvilinear surface, said second sides being parallel to one another and extending at the same angle relative to the said surface, an elongated groove being provided in the said curvilinear surface of each said member midway between the said parallel, elongated edges and extending the length of the said member said groove extending inwardly a predetermined distance greater than that of the said plurality of teeth;

(c) a cover plate unit comprising a cover plate having an inside planar surface and being of a predetermined dimension larger than the open front of the said cavity in the outlet box, spaced-apart, parallel, vertically disposed, planar members connected to and projecting perpendicularly outwardly a predetermined distance from the inside planar surface of the said cover plate, said members each being defined by outer planar surfaces;

(d) a second pair of elongated members being provided on the outer planar surface of respective said members projecting outwardly from the inside surface of the cover plate, each said second pair of elongated members defined by parallel elongated edges and a curvilinear surface complementary to that curvilinear surface of the earlier said first pair of elongated members, a plurality of equal width, parallel teeth being provided in each of said complementary curvilinear surfaces each of which projects inwardly a predetermined distance, each said tooth being defined by a first side defined by a plane perpendicular to said curvilinear surface and a second side intersecting said first side at a predetermined angle and tapering outwardly therefrom in a direction toward said curvilinear surface, said second sides being parallel to one another and extending in the same direction from the vertical opposite from that of the teeth on the first said pair of elongated members, an elongated groove being provided in said curvilinear surface midway between the said parallel edges and extending inwardly a predetermined distance greater than that of the said plurality of teeth, whereby on assembly of the cover plate unit with the outlet box the elongated members located on the spaced apart members projecting from the inside surface of the cover plate unit will be provided in operative mating engagement with respective elongated members located on the inside surface of the outlet box and in pressing engagement one with the other and the teeth on the mating members will be interlocked with one another preventing the separation of the cover plate unit from the outlet box.

9. A modular electrical receptacle assembly according to claim 8 wherein the said curvilinear surface in the first pair of elongated members is a concave surface and that in the second pair of elongated members is a convex surface.

10. An assembly suitable for housing an electrical outlet comprising in combination:

(a) an outlet box defined by spaced-apart, parallel upper and lower planar panels and spaced-apart, parallel planar side walls which intersect with and are perpendicular to the said panels whereby to define a box-like internal cavity having an open front; and (b) a cover plate unit for closure of the open front of the said internal cavity of the outlet box comprising in combination a cover plate having a rear planar surface, and a box-like member connected to and extending perpendicularly from the said rear planar surface, said box-like member being defined by spaced-apart, parallel top and bottom planar panels and spaced-apart, parallel planar side panels intersecting with and perpendicular to said top and bottom panels whereby to define a box-like internal cavity having an open rear, said box-like member being of such a dimension relative to the internal cavity in the outlet box that such member will protrude into the internal cavity of the outlet box in telescopic manner when the cover plate unit is brought into operative engagement with the outlet box;

(c) a first pair of elongated members each being provided on the inside surface of the said planar side walls of the outlet box and being disposed on each said side wall so as to be in opposition to one another, each said elongated member being defined by parallel side edges which in turn are disposed parallel to the planes defined by the upper and lower planar panels, a curvilinear surface being provided on each said elongated member and being horizontally disposed in opposition to one another, a plurality of parallel teeth being provided in each said curvilinear surface and extending inwardly therein an equal predetermined distance, said teeth being disposed perpendicularly to said parallel side edges each being defined by a first side defined by a plane perpendicular to said curvilinear surface and a second side intersecting the said first side at a predetermined angle and tapering outwardly therefrom in a direction toward said curvilinear surface and extending in the same lengthwise direction, an elongated, horizontally disposed groove being provided in the curvilinear surface and extending in the lengthwise direction of the elongated member midway between the said parallel elongated edges, said groove extending inwardly into the said curvilinear surface a predetermined distance at least as great as the inward distance of the said plurality of teeth;

(d) a second pair of elongated members each being provided on the outside surface of the planar side panels of the said box-like member, each said member being disposed horizontally and in opposition to respective said elongated members provided on the inside surfaces of the side walls of the outlet box, each said elongated member being defined by parallel side edges parallel to the planes defining the said upper and lower panels of the outlet box, a curvilinear surface being provided on each said elongated member complementary in shape and dimension to that curvilinear surface provided on each of the two first named pair of elongated members, a plurality of parallel teeth being provided in the said curvilinear surface of each of the said second pair of elongated members, each of said teeth being defined by a first side defined by a plane perpendicular to said convex surface and a second side intersecting said first side at a predetermined angle and tapering outwardly therefrom in a direction inwardly in said curvilinear surface, said second sides being parallel to one another and extending inwardly in said surface a distance equal to that distance of the teeth provided in the first pair of elongated members, said teeth being disposed laterally to the said parallel side edges and the second sides thereof extending in a lengthwise direction opposite to that of the teeth provided in the first pair of elongated members, an elongated groove being provided in the said curvilinear surface of each said elongated member and extending in lengthwise direction of the said member midway between the said parallel elongated edges, said groove being of the same shape and dimension as that groove provided in each of the first pair of elongated members and extending inwardly into the said curvilinear surface a distance at least as great as the inward distance of the said plurality of teeth but equal to that of the groove in each of the first pair of elongated members whereby when the cover plate unit and outlet box are in operative engagement with one another, the teeth on the elongated members provided on the outlet box will mesh and interlock with those teeth on the opposing elongated members provided on the box-like member of the cover plate unit so as to prevent separation of the cover plate from the outlet box.

11. An assembly according to claim 10 wherein the curvilinear surface of the first pair of elongated members is a concave surface and that of the second pair of elongated members is a convex surface.

12. An assembly according to claim 10 wherein means are provided on the inside surfaces of the upper and lower panels of the outlet box which cooperate with means provided on the outside surfaces of the top and bottom panels of the box-like member for vertically aligning the cover plate.

13. An assembly according to claim 12 wherein the vertical alignment means provided on the outlet box comprises a catch member extending outwardly a predetermined distance from and perpendicular to the inside planar surface of each upper and lower panel of the outlet box at the midpoint thereof, each said catch member being defined at its outer end by a knife-like edge extending in a lengthwise direction on the respective panels; and the means provided on the outside surfaces of the top and bottom panels of the box-like member of the cover plate unit comprises an elongated member defined by parallel, spaced-apart side edges and an outer surface centrally disposed on each said panel and extending in lengthwise direction, a plurality of parallel teeth being provided in said outer surface and extending in a lengthwise direction whereby on assembly of the cover plate unit with the outlet box the knife edges of the catch members will be located between next adjacent teeth in respective elongated members whereby to maintain the cover plate in predetermined vertical alignment.

14. An assembly according to claim 10 wherein at least one aperture is provided in the said cover plate which extends through the said plate and communicates with the internal cavity defined by the said box-like member.

15. An assembly according to claim 14 wherein two spaced-apart apertures are provided in the said cover plate, one being superposed vertically relative to the other and being of a size and shape to accommodate the protruding electrical sockets of a conventional double socket electrical receptacle unit.

16. An assembly according to claim 15 wherein catch means are provided on the inside surfaces of the upper and lower panels of the box-like member for maintaining a conventional double socket receptacle in vertical upright disposition whereby the outlet sockets thereof protrude through the respective apertures provided in the cover plate and are maintained in contact therewith.

17. An assembly according to claim 16 wherein the said catch means is a spring-like member projecting inwardly into the cavity of the box-like member and in a plane extending forwardly from the plane of each said panel.

18. An assembly according to claim 17 wherein the said spring-like member each comprises an elongated resilient planar member connected to a respective said inside planar surface midway between the longitudinal edges of the panels, said resilient member being capable of being depressed in a direction toward its respective panel when engaged by the top surface of a double socket receptacle and on disengagement with said surface springing back to its original location whereby the end of said member engages the back of the receptacle unit holding it in place.

19. An assembly according to claim 10 wherein spaced-apart openings are provided in the cover plate which communicate with the said box-like internal cavity, said openings being located in the same plane defined by the grooves provided in the cooperating first and second elongated members when said outlet box and cover plate unit are in assembly with one another, whereby a tool can be inserted into each of said openings for travel along respective grooves for detaching the plurality of teeth in one elongated member from the plurality of teeth in the member mating therewith.

20. An electrical receptacle assembly comprising:
(a) an outlet box defined by spaced-apart parallel upper and lower panels each having a planar inner surface and spaced-apart parallel side walls each having an inner planar surface, said upper and lower panels intersecting in perpendicular fashion with said side walls defining an open front internal cavity;
(b) a cover plate unit comprising a cover plate having an inner planar surface for closure of said open front of the outlet box and a box-like member connected to and extending perpendicularly outwardly from said inner planar surface defined by spaced-apart, parallel upper and lower panels each having an outer planar surface and parallel, spaced-apart side panels intersecting with said upper and lower panels each having an outer planar surface; and
(c) means for detachably connecting the cover plate unit with the outlet box when such are assembled together and permitting rotation of the cover plate unit relative to the outlet box in a clockwise and counter-clockwise manner in a vertically disposed plane for vertically aligning the cover plate unit comprising a first pair of elongated members being provided on each of the said side walls of the outlet box each defining a curvilinear surface extending lengthwise of the outlet box and a second pair of elongated members being provided on the outer surface of the side panels of the box-like member of the cover plate unit, each of which defines a curvilinear surface complementary to that curvilinear surface of the first pair of members and extending in a lengthwise direction of the said box-like member, a plurality of teeth being provided in the curvilinear surface of each of the first pair of elongated members each of which is defined by a side which extends in a predetermined direction and angle relative to the lengthwise direction in each elongated member, a plurality of teeth being provided in the curvilinear surface of each of the second pair of elongated members each of which is defined by a side which extends in the same predetermined direction lengthwise in each elongated member but opposite to those teeth provided in the first pair of elongated members whereby on assembly of the cover plate unit with the outlet box each of the first pair of elongated members is in cooperative engagement with a respective elongated member of the said second pair and the teeth in such members are interlocked with one another.

21. An electrical receptacle assembly according to claim 20 wherein each of the said teeth in the elongated members are defined by another side which lies in a plane perpendicular to the respective curvilinear surfaces, said side members of each of the teeth intersecting at a predetermined angle.

22. An electrical receptacle assembly according to claim 21 wherein the said angle is 60 degrees.

23. An electrical receptacle assembly according to claim 22 wherein the plane sides of next adjacent teeth are located about 0.025 inches apart from one another.

24. An electrical receptacle assembly according to claim 23 wherein the planar side of a tooth measures about 0.070 inches.

* * * * *

UNITED STATES PATENT AND TRADEMARK OFFICE
CERTIFICATE OF CORRECTION

PATENT NO. : 5,223,673

DATED : June 29, 1993

INVENTOR(S) : Gay L. Mason

It is certified that error appears in the above-identified patent and that said Letters Patent is hereby corrected as shown below:

Claim 1, column 19, line 67, delete the word "less."

Claim 1, column 20, line 19, delete the word "less" and substitute the word -great- for the word "greater."

Claim 7, column 21, line 57, delete the word "less."

Signed and Sealed this

Fifteenth Day of February, 1994

Attest:

BRUCE LEHMAN

Attesting Officer

Commissioner of Patents and Trademarks